US012671745B2

(12) United States Patent
Sarathchandra et al.

(10) Patent No.: US 12,671,745 B2
(45) Date of Patent: Jun. 30, 2026

(54) METHODS AND APPARATUS FOR TERMINAL FUNCTION DISTRIBUTION

(71) Applicant: InterDigital Patent Holdings, Inc., Wilmington, DE (US)

(72) Inventors: Magurawalage Chathura Madhusanka Sarathchandra, London (GB); Mona Ghassemian, Kent (GB); Ulises Olvera-Hernandez, Saint-Lazare (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 176 days.

(21) Appl. No.: 18/556,989

(22) PCT Filed: Apr. 29, 2022

(86) PCT No.: PCT/US2022/027014
§ 371 (c)(1),
(2) Date: Oct. 24, 2023

(87) PCT Pub. No.: WO2022/232564
PCT Pub. Date: Nov. 3, 2022

(65) Prior Publication Data
US 2024/0214458 A1      Jun. 27, 2024

Related U.S. Application Data

(60) Provisional application No. 63/181,332, filed on Apr. 29, 2021, provisional application No. 63/181,712, filed on Apr. 29, 2021.

(51) Int. Cl.
*H04L 67/303* (2022.01)
*H04L 67/141* (2022.01)

(52) U.S. Cl.
CPC .......... *H04L 67/303* (2013.01); *H04L 67/141* (2013.01)

(58) Field of Classification Search
CPC .. H04L 67/303; H04L 67/141; H04L 65/1094
See application file for complete search history.

(56) References Cited

U.S. PATENT DOCUMENTS 8,141,115 B2 *   3/2012   Wohlert ............. H04N 21/4788
                                                            709/219
9,560,147 B2 *   1/2017   Shaheen ............... H04L 67/141
(Continued)

OTHER PUBLICATIONS

Third Generation Partnership Project, "Technical Specification Group Services and System Aspects; System architecture for the 5G System (5GS); Stage 2 (Release 17)," 3GPP TS 23.501 V17.0.0 (Mar. 2021).

(Continued)

*Primary Examiner* — Alex Tran
(74) *Attorney, Agent, or Firm* — Volpe Koenig

(57) ABSTRACT

The disclosure pertains to methods and apparatus for establishing and maintaining a single PDU session with multiple terminal devices, such as for transferring a terminal function between two WTRUs or distributing the performance of a terminal function amongst a plurality of WTRUs. Additionally, methods and apparatus for SLA mapping for terminal function distribution are provided. SLAs for a single PDU session may be mapped among multiple distributed WTRUs based on the function demands for network slice selection. A set of devices running functions of the same PDU session may be selected and registered to the suitable slices based on their required SLAs. A network assisted function distribution slice selection function may serve over multiple slices in the 5G Core for an ongoing single PDU session among the chosen set of WTRUs.

18 Claims, 15 Drawing Sheets

(56)               References Cited

U.S. PATENT DOCUMENTS

| | | | | |
|---|---|---|---|---|
| 11,412,556 B2 * | 8/2022 | Dao | ...................... | H04W 76/10 |
| 11,463,946 B2 * | 10/2022 | Dao | ...................... | H04W 40/20 |
| 11,950,320 B2 * | 4/2024 | Lim | ...................... | H04W 8/183 |
| 12,279,157 B2 * | 4/2025 | Ly | ........................... | H04W 8/04 |
| 2011/0040836 A1 | 2/2011 | Allen et al. | | |
| 2015/0365444 A1 * | 12/2015 | De Foy | ................ | H04L 67/141 |
| | | | | 370/261 |
| 2019/0191467 A1 | 6/2019 | Dao et al. | | |

OTHER PUBLICATIONS

3rd Generation Partnership Project; Technical Specification Group Services and System Aspects; Study on system enhancement for Proximity based Services(ProSe) in the 5G System (5GS); (Release 17); 3GPP TR 23.752 V17.0.0, Mar. 2021, 183 pages.
Third Generation Partnership Project, "Technical Specification Group Services and System Aspects; Procedures for the 5G System (5GS); Stage 2 (Release 17)," 3GPP TS 23.502 V17.0.0 (Mar. 2021).

* cited by examiner

METHODS AND APPARATUS FOR TERMINAL FUNCTION DISTRIBUTION

CROSS-REFERENCE TO RELATED APPLICATIONS

This application is a U.S. National Stage Application under 35 U.S.C. 371 of International Patent Application No. PCT/US2022/027014, filed Apr. 29, 2022, which claims priority to and the benefit of U.S. Provisional Application No. 63/181,332 filed in the U.S. Patent and Trademark Office on Apr. 29, 2021, and U.S. Provisional Application No. 63/181,712 filed in the U.S. Patent and Trademark Office on Apr. 29, 2021, the entire contents of each of which is being incorporated herein by reference as if fully set forth below in their entirety and for all applicable purposes.

BACKGROUND

Mobile communications using wireless communication continue to evolve. A fifth generation (5G) of mobile communication radio access technology (RAT) may be referred to as 5G new radio (NR). A previous (legacy) generation of mobile communication RAT may be, for example, fourth generation (4G) long term evolution (LTE).

Mobile telecommunication devices, such as cellular telephones, tablet computers, and the like, sometimes generically referred to herein a wireless transmit/receive units or (WTRUs), have become ever more popular and have become the primary device of choice of users for consuming electronic content and application experiences. Likewise, due to the recent advancements in varying device form factors, the ubiquity of such devices, and capabilities of such devices (e.g., content presentation devices such as TVs and projectors) has significantly increased. However, when consuming a single experience or content (e.g., playing a video game or watching a movie), users typically have been limited to consuming the content on a single WTRU device, despite that fact that other, better devices for consuming the given content may have become available to the user during the period that the user is consuming the content (or, conceivably, may have been available even at the time of initiating the consumption of the content, but was not selected by the user for some reason). For instance, a user may begin watching a movie on the user's cellular telephone while riding in an automobile, but then, upon arriving at a destination, e.g., the user's home, has numerous new choices of devices for watching the movie (e.g., bedroom television, living room television, tablet computer, or desktop computer). The user may wish to transfer the experience to be consumed on a different device, In some cases, the user may wish to transfer a subset of the portions of the experience to different devices, e.g., keep watching the video portion of the movie on the user's cellular telephone, but listen the audio portion of the movie on a home audio system.

SUMMARY

Embodiments disclosed herein generally relate to wireless communication networks. For example, one or more embodiments disclosed herein are related to methods, apparatuses, and systems for establishing and maintaining a single packet data unit (PDU) session with multiple terminal devices, such as for transferring a terminal function between two WTRUs or distributing the performance of terminal functions amongst a plurality of WTRUS.

In addition, some embodiments disclosed herein are related to methods, apparatuses, and systems for service level agreement (SLA) mapping for terminal function distribution. For example, SLAs for a PDU session (e.g., a single PDU session) may be mapped among one or more distributed WTRUs based on one or more function demands for a network slice selection. A set of devices running functions of the PDU session (e.g., same PDU session) may be selected and registered to the suitable slices based on their required SLAs. A network assisted function distribution slice selection function may serve over multiple slices in the 5G Core for an ongoing single PDU session among the chosen set of WTRUs.

In one embodiment, a method implemented in a WTRU for wireless communications includes receiving identities of a set of devices available for sharing one or more terminal functions with the WTRU; selecting at least one device of the set of devices to share a terminal function being performed by the WTRU; generating a packet data unit (PDU) session identifier (ID) associated with the terminal function; transmitting a PDU session request message, and the PDU session request message comprises information indicting at least the PDU session ID and a respective identity of each selected device of the set of devices; and receiving a PDU session establishment message after the PDU session request message was transmitted. The method may also include distributing the terminal function with each selected device of the set of devices in a network. The method may include performing the terminal function, and querying a discovery engine for the set of devices available for sharing the terminal function with the WTRU. The method may also include registering with the discovery engine in a network to indicate availability of the WTRU to share the terminal function with the at least one device of the set of devices. The one or more terminal functions may include the terminal function. The PDU session ID may be associated with the one or more terminal functions, and the PDU session ID may be shared among the WTRU and the at least one device of the set of devices.

In another embodiment, a method implemented in a WTRU for wireless communications includes transmitting a first message to a network, and the first message comprises information indicating any of: a request for a data session, a WTRU identification to be associated with the data session, a capability of the WTRU, and/or a request for a service to be provided by the network; receiving a second message from the network, wherein the second message comprises information indicating any of: the WTRU identification, a slice identification associated with the requested service, and/or the capability of the WTRU; and transmitting a third message to the network, and the third message comprises information indicating a request to register the WTRU identification such that the WTRU can use the requested service associated with the slice identification. The method may also include transmitting a fourth message to the network using the requested data session, and the fourth message comprises information indicating the slice identification and/or data for the requested service.

In various embodiments, a WTRU comprising a processor, a receiver, a transmitter, and memory is configured to implement one or more methods disclosed herein. For example, a WTRU for distributing terminal function(s) with/to other devices may be configured to perform a terminal function; query a discovery engine for devices available for sharing the terminal function with the WTRU; receive identities of devices available for sharing terminal functions with the WTRU; select at least one of the devices (available for sharing terminal functions) to share the terminal function being performed by the WTRU; generate a PDU session ID corresponding to the terminal function; transmit a PDU session request message (comprising at least the PDU session ID and the identity of the at least one selected device) to the network; and receive a PDU session establishment message from the network. The WTRU may be further configured to transmit function state information of the terminal function/service to the at least one selected device, and communicate with the at least one selected device to share performance of the terminal function.

BRIEF DESCRIPTION OF THE DRAWINGS

A more detailed understanding may be had from the detailed description below, given by way of example in conjunction with the drawings appended hereto. Figures in such drawings, like the detailed description, are exemplary. As such, the Figures and the detailed description are not to be considered limiting, and other equally effective examples are possible and likely. Furthermore, like reference numerals ("ref.") in the Figures ("FIGS.") indicate like elements, and wherein.

DETAILED DESCRIPTION

1 Introduction

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

2 Example Networks for Implementation of the Invention

Figure 1A:
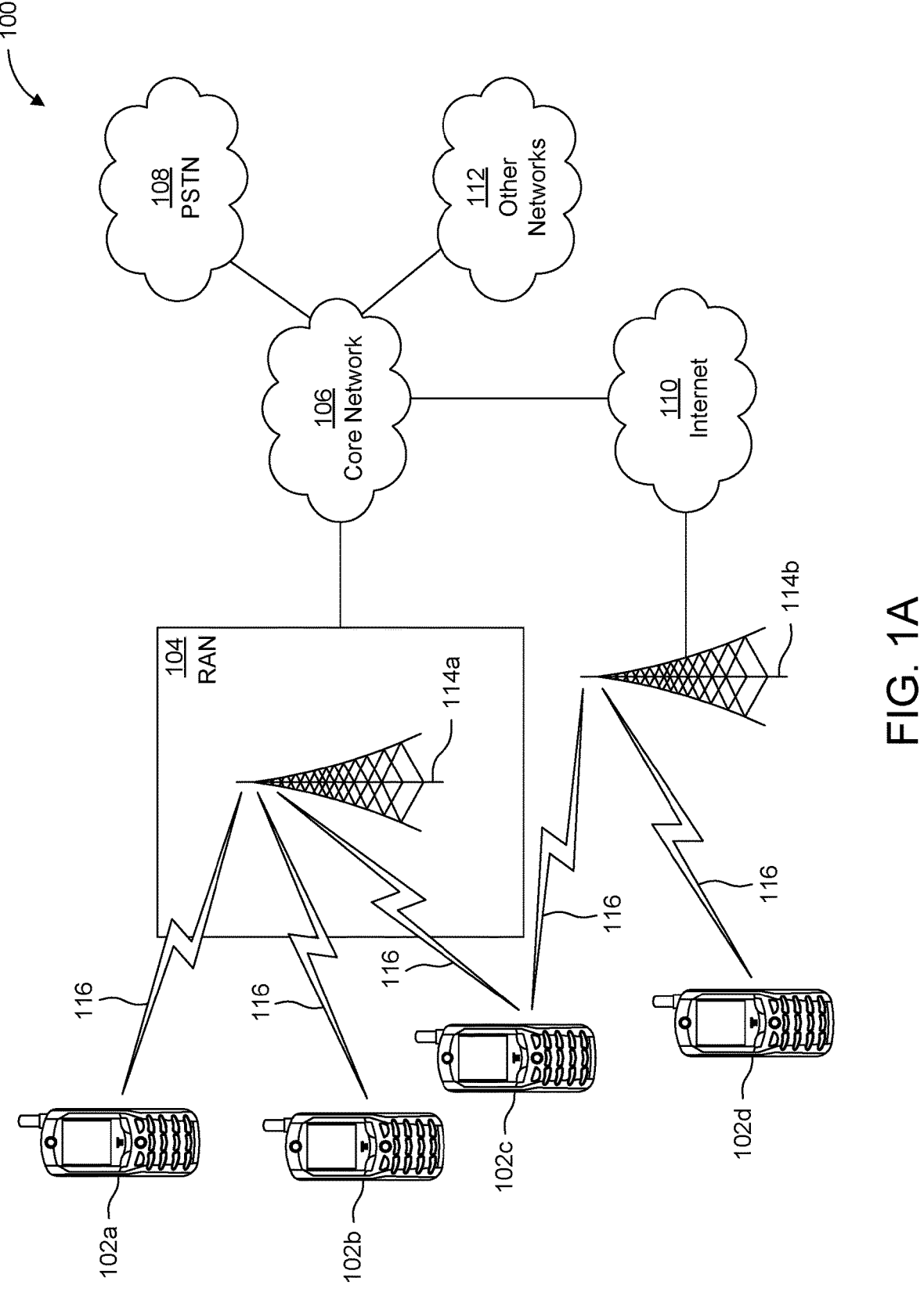
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IOT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
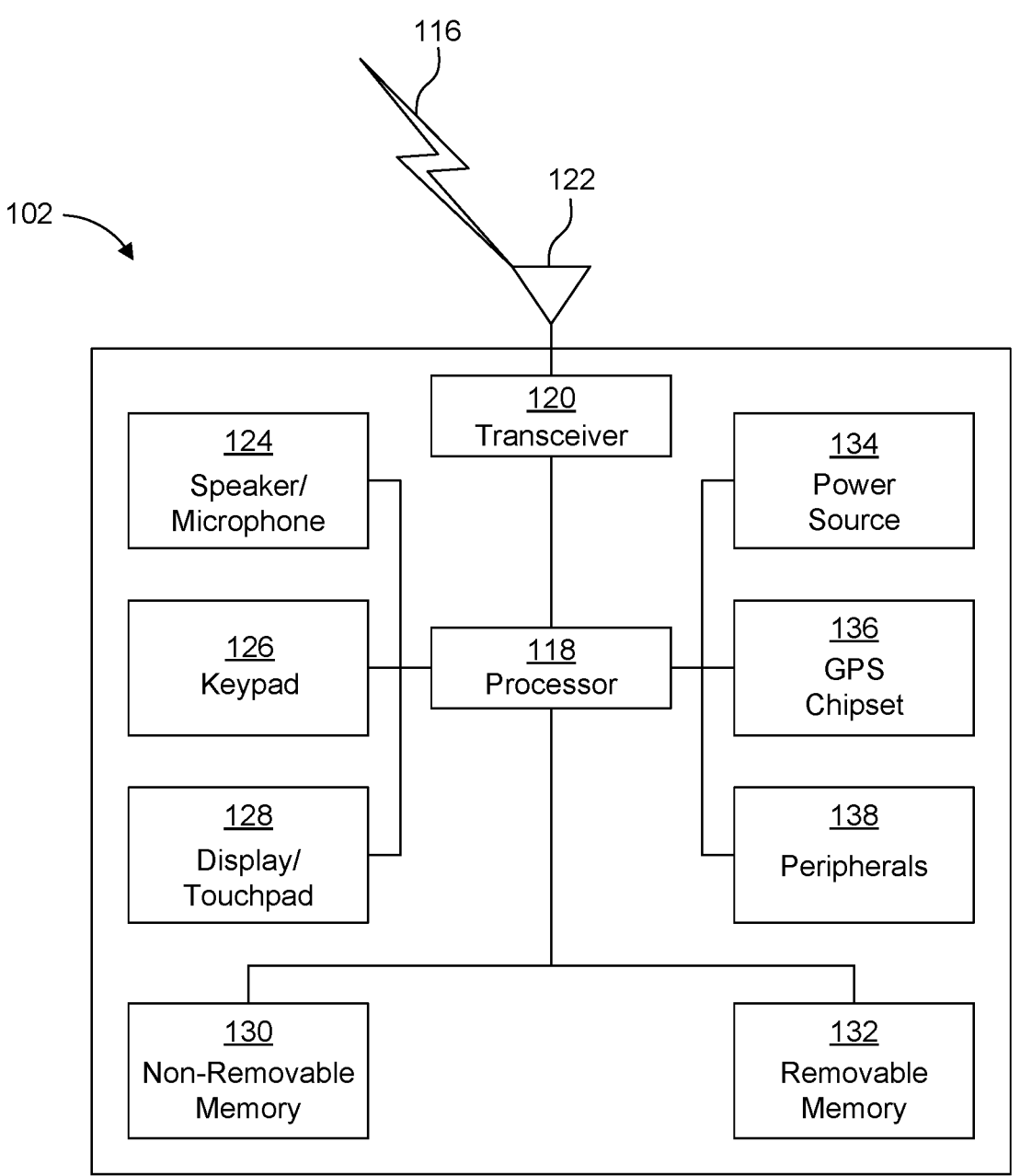
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM)

radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
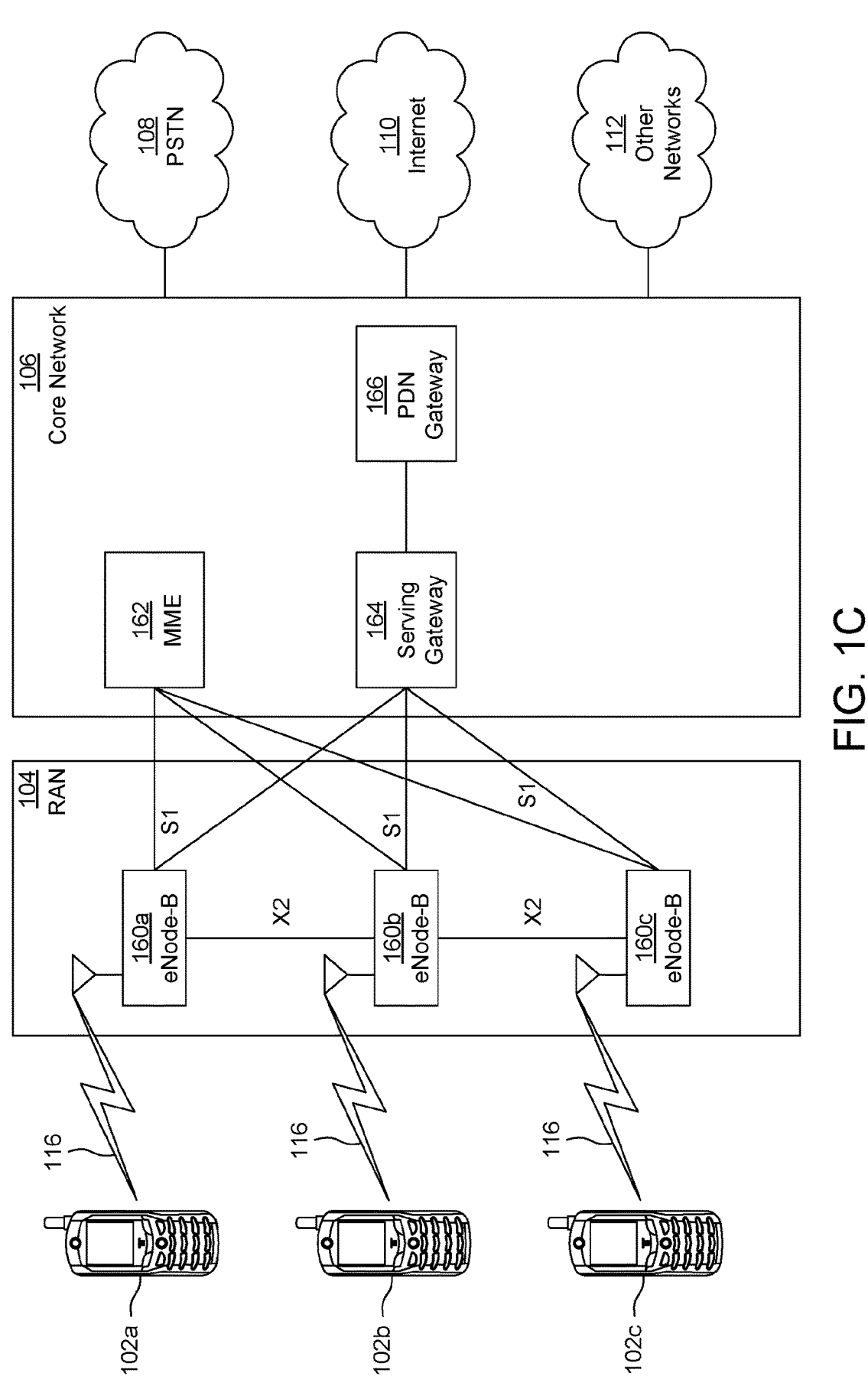
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHZ, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHZ, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHZ, 8 MHZ, 16 MHZ, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
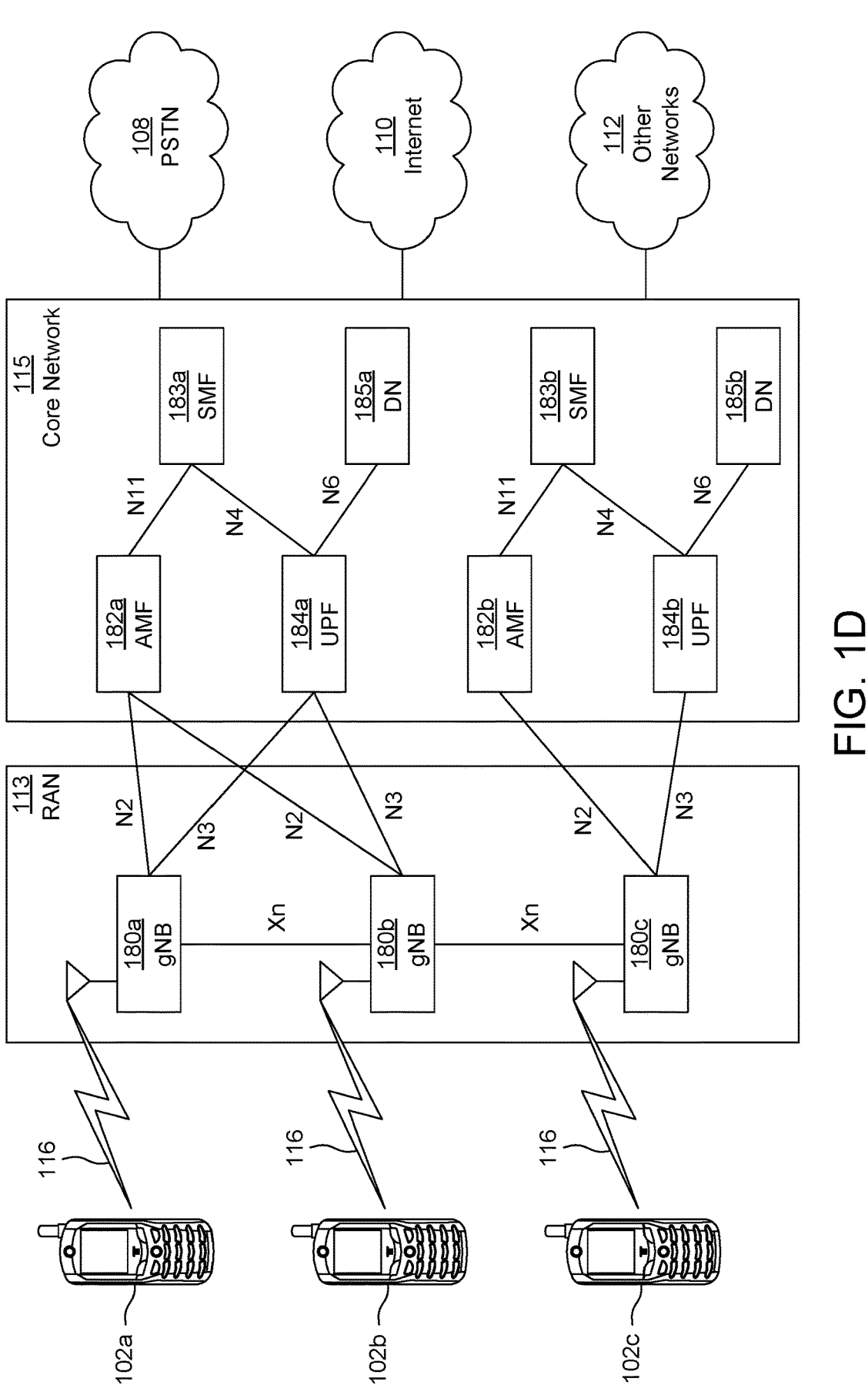
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 180b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF a82a, 182b may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

3 Distributed Terminal Functionality

Efficient, methods and apparatus for partitioning and transferring of terminal functions allowing the offload of specific functionality from a first WTRU to one or more other WTRUs for improving the overall user experience (e.g., a gaming experience may be transferred to a larger display and better gaming control equipment for improved user experience) are desirable for many reasons. For instance, as noted above, a consumer of digital content may be mobile and, during the consumption of digital content, may come into proximity of a more preferable device for consuming the particular content, and may wish to transfer part or all of the functionality to that different telecommunications device without the need to restart the experience or perform a convoluted series of manual steps to cause the transfer to occur. Moreover, offloading computing-heavy functions from battery-powered, mobile devices to other, line-powered devices may improve battery usage/life of the user's mobile device, while also enabling the harnessing of enhanced functionality of other devices, improving the overall user experience.

In current wireless network systems, Protocol Data Unit (PDU) sessions are established for providing end-to-end user plane connectivity between a WTRU and a Data Network (DN) through the User Plane Function (UPF). One PDU may support multiple QoS flows. Therefore, each participating device (i.e., WTRUs or terminals) establishes a separate PDU session towards the corresponding DN prior to the function distribution being executed. Moreover, the Session Management Function (SMF) of the network is responsible for creating, removing, and updating the PDU sessions and managing the WTRU contexts with the UPF.

Figure 2:
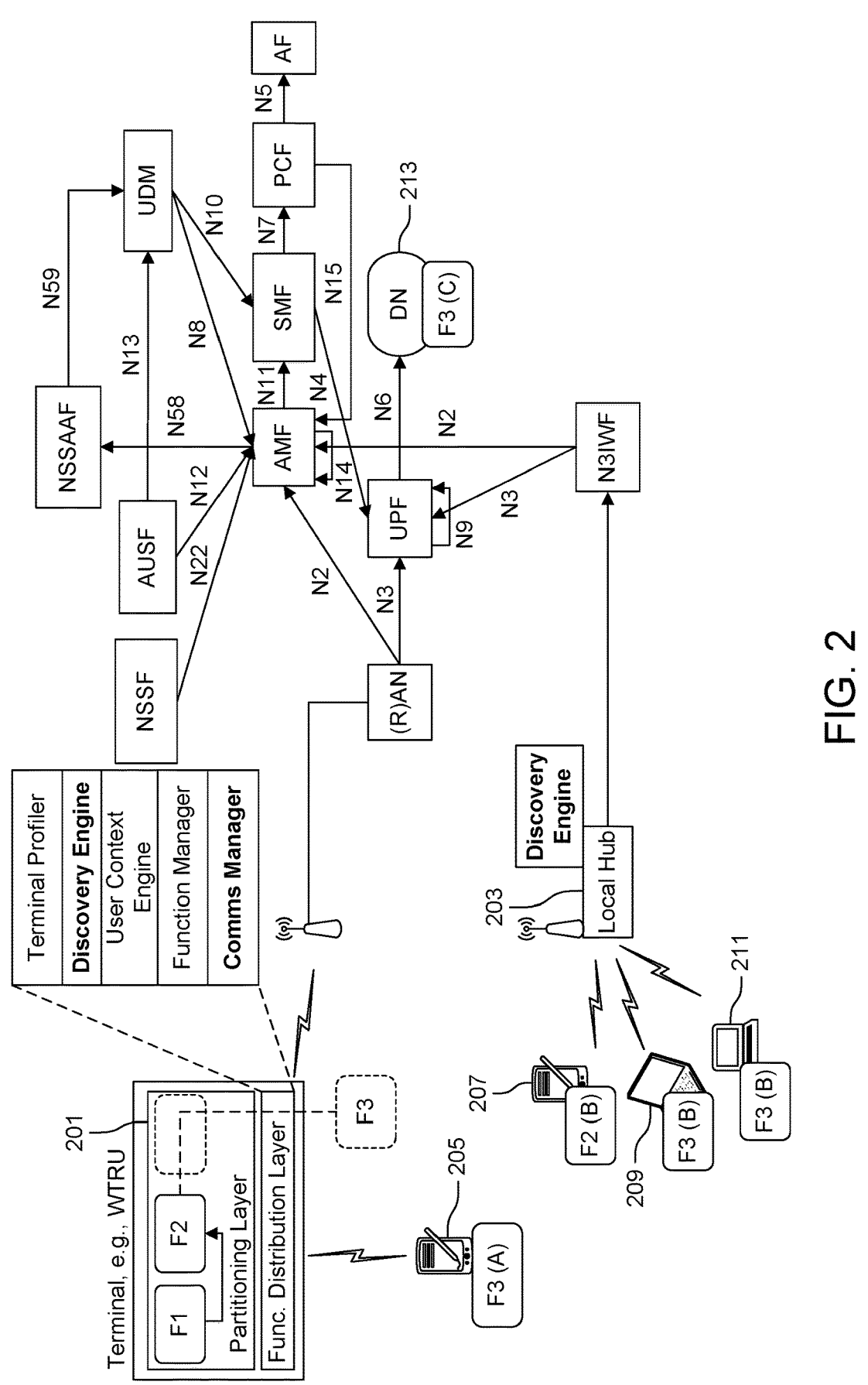
FIG. 2 is a network block diagram illustrating various components with a network, in accordance with an embodiment.

This disclosure considers three different scenarios for terminal function distribution, namely, Device-to-Device (hereinafter Scenario A), Device-to-Edge (hereinafter Scenario B), Device-to-Cloud (hereinafter Scenario C), as depicted in FIG. 2.

Particularly, FIG. 2 illustrates an exemplary wireless network comprising various functional components and/or nodes commonly found in a 5G network, including an NSSF (Network Slice Selection Function), AUSF (Authentication Server Function), NSSAF (Network Slice-Specific Authentication and Authorization Function), UDM (Unified Data Management, AMF, SMF, PCF (Policy Control Function), AF (Application Function), RAN (Radio Access Network), UPF, DN, N31WF (Non-3GPP Interworking Function) and a plurality of WTRUs. In accordance with an embodiment one or more of the WTRUs (e.g., WTRU 201) may be equipped with a Function Distribution Layer comprising a Terminal Profiler, Discovery Engine, User Context Engine, Function Manager, and Comms Manager as described in greater detail below. A local hub 203 as described in greater detail below also may be included in the network.

A Device-to-Device interaction (Scenario A) in accordance with embodiments may be carried out between, e.g., WTRU 201 and WTRU 205. A Device-to-Edge interaction (Scenario B) in accordance with embodiments may be carried out between WTRU 201 and another WTRU, such as any of WTRUs 207, 209, 211 through the network, and a Device-to-Cloud interaction (Scenario C) in accordance with embodiments may be carried out between WTRU 201 and a DN 213.

The methods and apparatus disclosed herein allow distribution of a set of terminal functions (along with corresponding data and/or state information) across multiple terminals/devices in a single PDU session, and with no interruption of service. The methods and apparatus disclosed herein assure that ongoing sessions between terminal functions are distributed among the chosen terminals while the single PDU session (now distributed) serves the primary terminal (i.e., the end user).

The new components are described in section 3.1 and procedures for distributing terminal functions across multiple terminals/devices over a single session using those components are described in Section 3.3. Section 3.2 introduces a local hub apparatus that may be implemented to facilitate the registering and discovery of the capabilities of other devices within WTRU's vicinity for purposes of function distribution.

3.1 Function Distribution Layer

Terminal Function Distribution Layer is concerned of virtualization of terminal functions, management of resources (device local and network) and function lifecycle. Functions at various layers of the device stack may be partitioned towards ultimately executing those functions across the network towards optimizing resources and user experience.

3.1.1 Terminal Profiler

Profiler provides functional (e.g., type of HW functions, system calls) and runtime information (e.g., runtime CPU and energy utilization) about existing individual device functions. Such information may be used for making function lifecycle management and resource management decisions, by both Function Manger and Comms Manger components. This component may be realized as an Operating System or application layer service with security privileges to gather said information.

3.1.2 User Context Engine

The user context engine may gather user contextual information both through the sensors in the device (e.g., user location through the GPS receiver) and through other services/applications providing information about user behavior (e.g., the user's calendar). This component may be realized as an Operating System or application layer service with API (Application Protocol Interface) calls to corresponding sensor software drivers and webservices (e.g., REST API calls).

Continuous gathering and storing of such information may cause excessive usage of persistent and non-persistent storage. Therefore, in an embodiment, the User Context Engine may gather and store information only upon receiving requests from the Function Manager and Comms Manager components (described below).

3.1.3 Discovery Engine

For offloading device functions, the Function Distribution Layer should be able to discover available devices that were previously unknown. Particularly, in cases where the user is mobile, suitable devices should be discovered for offloading functions. The Discovery Engine may provide an API for actively registering/querying available devices, e.g., devices at the edge of the network, devices in the cloud, and devices within proximity of the user's device (for Function/Comms Manager components). Alternately or additionally, it may also actively scout for devices in proximity of the user by periodically scanning the network(s) and then providing newly found devices to the Communication Manager components. Such information, in turn, may be used for making function offloading/distribution decisions. Optionally, the Discovery Engine may use discovery services provided by the network operator, discovery services provided by non-3GPP access networks, or point-to-point devices/network (e.g., Bluetooth) discovery methods for discovering new devices.

3.1.4 Function Manager

In an embodiment, the function manager makes lifecycle management decisions on locally-running device functions (e.g., turning off functions to save energy) as well as decisions on offloading/distributing functions to be executed on discovered devices that are better suited for the task or otherwise appropriate. Ultimately, the decisions being made may optimize the energy efficiency of the local device, resource utilization of the device and the network, and the overall user experience. Such decisions may be made based on user behavior (via the Terminal Context Engine), resource consumption (via the Terminal Profiler), and/or user mobility/device availability (through the Discovery Engine).

3.1.5 Communication Manager

The Communication Manager is concerned with managing the interconnectivity between devices that provide capabilities for the distributed execution of terminal functions as well as the interconnectivity between the functions them-selves. Such procedures may include selection (e.g., network selection) and management of communication media for functions.

3.2 Local Hub

An end-user device (a WTRU) may provide its resources to be used by other devices/users in their vicinity, e.g., computing resources, display screens, speakers, etc. The Local Hub provides an API (functionality of the Discovery Engine) for such resource provider devices for registering their capabilities and to allow them to be discovered by other devices within proximity (e.g., home, campus, shopping mall). Access to the Local Hub and its APIs (e.g., registry and discovery) may be provided over a wireless network (e.g., Wi-Fi). Capability and available information of each registering device is provided to the Local Hub during registration and stored in the hub until they are deregistered or a specific registration expiry time elapses.

The Local Hub 203 may operate as an independent entity without any direct connectivity to the operator's core net-work, or it may connect to the operator's network as a non-3GPP network for extending various operators' network services to the connected devices/terminals.

3.3 Terminal Function Distribution Over a Single PDU Session

Figure 3:
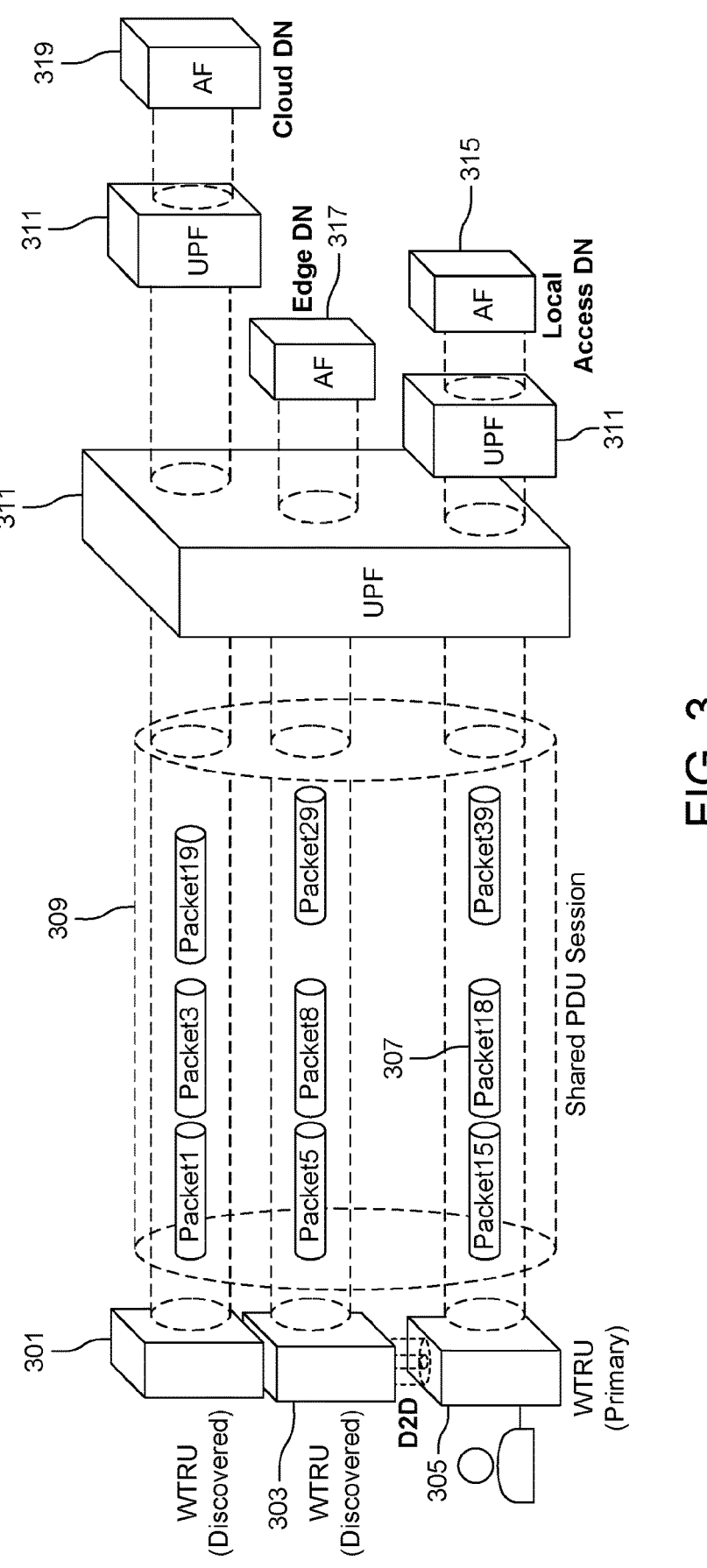
FIG. 3 is a diagram illustrating the concept of a single PDU session over distributed terminals, in accordance with an embodiment.

FIG. 3 depicts the concept of a Single PDU Session over distributed terminals that connect to specialized Application Functions to execute distributed functionality. As shown, a plurality of WTRUs 301, 302, 305 share packets 307 in a single shared PDU session 309 via one or more UPFs 311.

As previously noted, the execution may take place in the devices itself, as illustrated in connection with AF 315, at an Edge Data Network, as illustrated in connection with AF 317, or at a Cloud Data Network, as illustrated in connection with AF 319.

Figure 4:
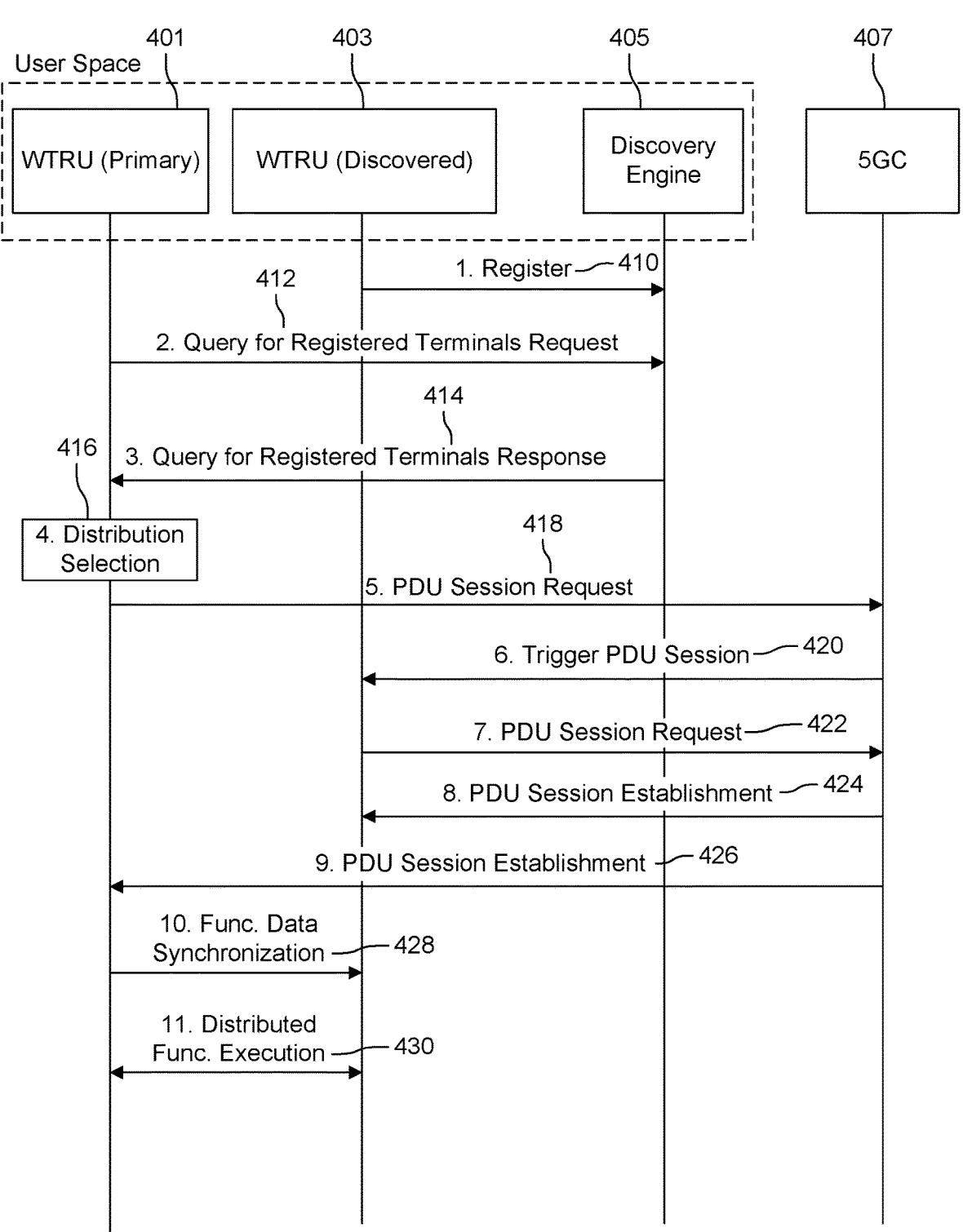
FIG. 4 is a signal flow diagram illustrating establishment of a single PDU session for a plurality of terminal devices, in accordance with an embodiment.
Figure 5:
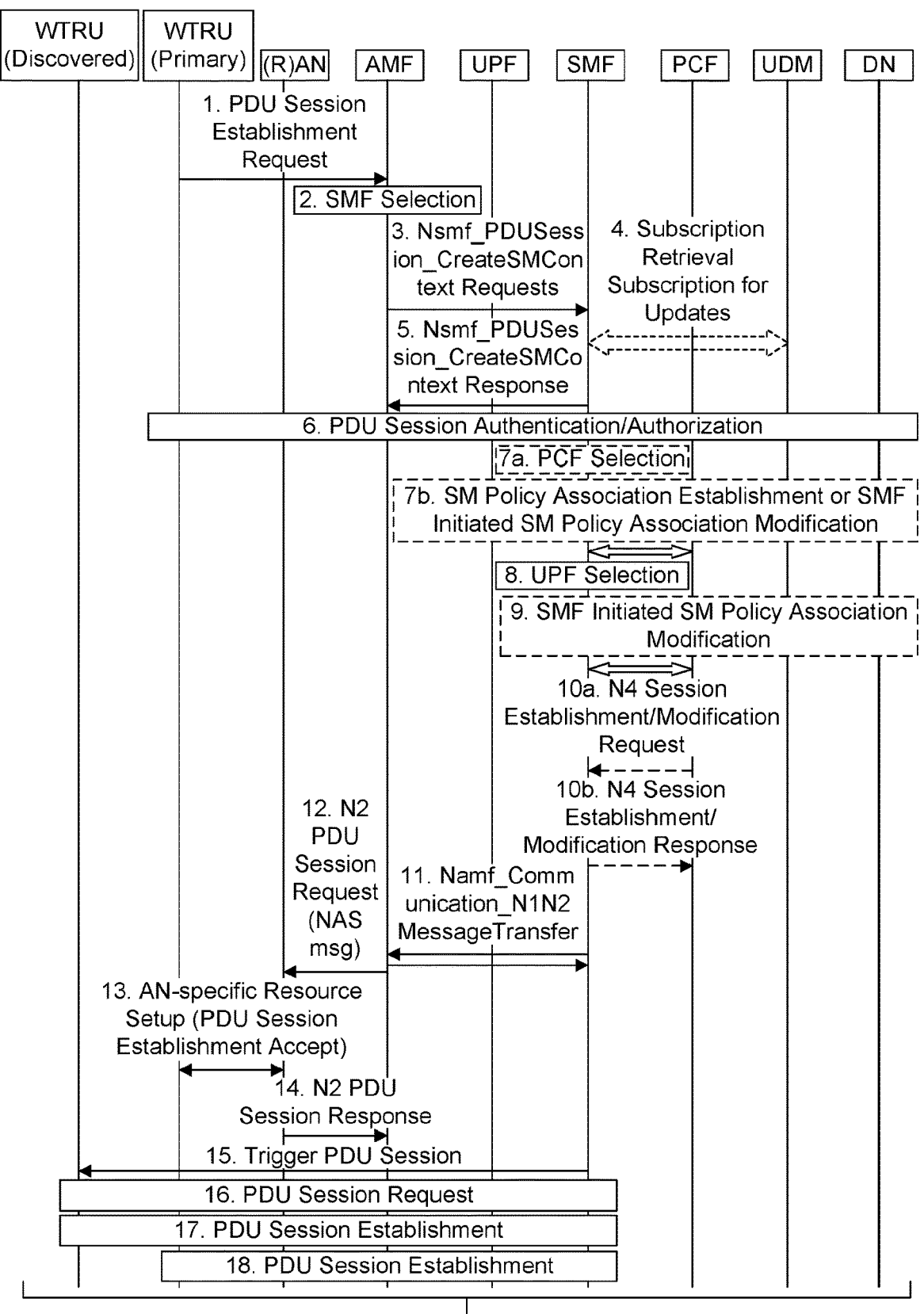
FIG. 5 is another signal flow diagram illustrating establishment of a single PDU session for a plurality of terminal devices, in accordance with an embodiment.
Figure 5:
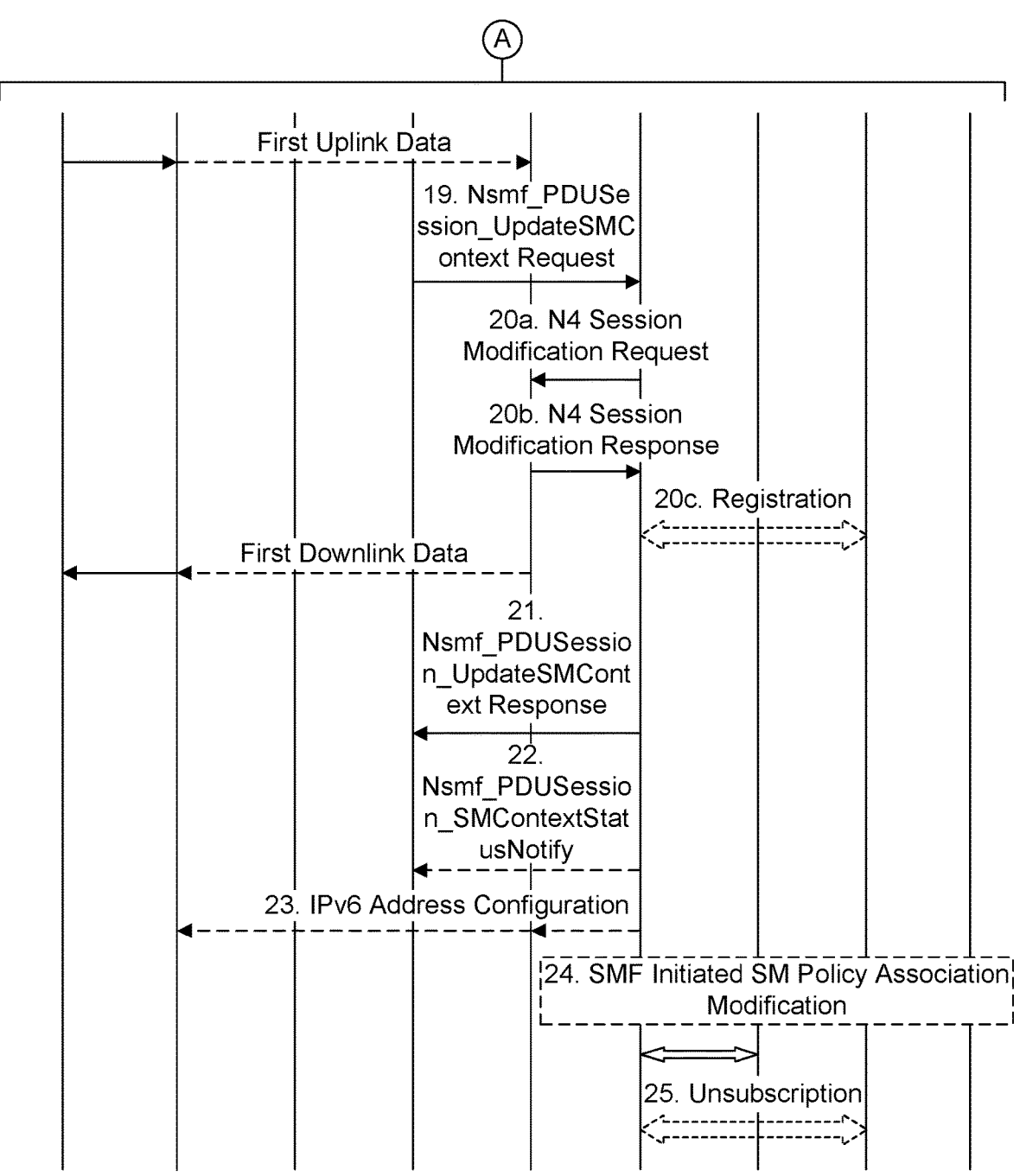

FIG. 4 is a signal flow diagram demonstrating an exem-plary scenario where the procedures are being used for distributing terminal functions from the primary WTRU 401 to other chosen WTRUs/devices (e.g., 403) over a single PDU session in accordance with an embodiment. FIG. 5 is another signal flow diagram based on Figure 4.3.2.2.1-1 of 3GPP TS 23.502 v17.0.0 (hereinafter "TS 23.502") showing how the process described therein for UE-requested PDU Session Establishment for non-roaming and roaming with local breakout may be modified in accordance with an embodiment. Particularly, as shown in FIG. 5 and as will be discussed in greater detail below, in the embodiment repre-sented by FIG. 5, the signal flow from Figure 4.3.2.2.1-1 of TS 23.502 would be altered by (1) modifications to steps 1, 2, and 3 (labelled steps 1, 2, and 3 in both FIG. 4.3.2.2.1-1 of TS 23.502 and FIG. 5) and the addition of steps 15, 16, 17, and 18 in FIG. 5. Also, another UE/WTRU (i.e., the "discovered" UE/WTRU to which terminal functions will be transferred) is added in the first column of FIG. 5 as compared to FIG. 4.3.2.2.1-1 of TS 23.502. Thus, other than the modifications to steps 1-3 and the addition of steps 15-18 all of the other steps in FIG. 5 may remain essentially the same as the corresponding steps in Figure 4.3.2.2.1-1 of TS 23.502. However, note that steps 15-21 of Figure 4.3.2.2.1-1 of TS 23.502 are renumbered as steps 19-25 in FIG. 5 due the addition of steps 15-18 in FIG. 5.

Referring to FIG. 4, terminals/devices that are available for onloading functions that are being distrusted, register (410) with the Discovery Engine 405 (e.g., in a Local Hub or the Primary Device 401). The registration process in the Discovery Engine gathers/collects and stores the WTRU ID that is being used for uniquely identifying the WTRU within the 5G Core (5GC) network 407. Along with the UE ID, each registering device (e.g., WTRU 403) provides its computing (e.g., CPU size, RAM size), networking (e.g., cellular status) capabilities and location information (i.e., GPS coordinates) to the Discovery Engine 405.

Devices may register through an API that is provided by the Discovery Engine.

The registration may be automatically performed by dis-covering terminals/devices within proximity of the Discov-ery Engine.

The WTRU's ID can also be a service ID, or any other sharable ID that can be used to uniquely identify terminals/devices (or services/functions within them).

The primary/initiating UE 401 sends a request 412 to the Discovery Engine 405 querying about newly discovered/updated terminals/devices. In cases where the Discovery Engine 405 resides within the same device 401, a callback or IPC procedure may be used for obtaining this informa-tion. We assume that the Primary UE has any required access permissions in the Discovery Engine (e.g., in a Local Hub) for obtaining this information.

Alternatively, the primary WTRU 401 may receive updates on newly discovered devices automatically from the Discovery Engine.

The Discovery Engine 405 responds (414) to the primary WTRU 401 with all information gathered in the registration process for each registered device.

The Primary WTRU 401 decides on the most suitable distribution of terminal functions among the devices (416). In making the function distribution decision, it uses infor-mation gathered from the Profiler, User Context Engine, and Discovery Engine, for deciding what (which functions), when (the appropriate time), and where (best devices) to offload functions.

Alternately, the selection of the most suitable distribution of terminal functions may be performed by an entity within the network (e.g., an application function at the edge).

Once the best terminals/devices for distributing/offload-ing, have been selected, the primary UE 401 (the Commu-nication Manager) triggers the function distribution process by establishing connectivity to the selected devices. Thus, it first initiates the creation of the PDU session to be shared among all participating devices, by communicating with the 5G core network. Particularly, as part of the session initia-tion, the primary UE 401 generates a Session ID. The IDs of the devices that are being selected in step 4, along with the generated Session ID, are provided in a PDU session request 418 to the 5GC 407 for creating a single session to be distributed among the selected devices.

This step, 418, corresponds to steps 1, 2, and 3 of both FIG. 5 and Figure 4.3.2.2.1-1 of TS 23.502, and alters the 3GPP PDU initiation procedures of TS 23.502 by incorpo-rating the information of additional UE IDs into the "PDU Session Establishment Request In case the decision on the most suitable distribution of terminal functions is performed by an entity in the network (416), this request may be performed by the corresponding entity (following network triggered PDU session initiation).

Next, the 5GC 407 sends a PDU session trigger message 420 to each terminal/device (WTRU ID) that was identified in message 418.

The 5GC may use existing trigger procedures (such as SMS) for performing this step.

Alternately, as depicted in FIG. 5 (step 15), the Session Management Function (SMF) may send the trigger message 420 to all corresponding terminals/devices.

Each terminal/device (e.g., 403) that receives the PDU session trigger request (420) sends a PDU session establishment request 422 to the 5GC 407. This is analogous to step 16 in FIG. 5.

The 5GC 407 establishes PDU sessions (e.g., PDU session establishment messages 424) with the WTRUs identified in message 418 (e.g., discovered WTRU 403) using the same session ID. Therefore, corresponding devices are added to the same PDU session. This is analogous to step 17 in FIG. 5, where all selected/discovered UEs are added to the same PDU session.

The 5GC 407 also accepts and establishes the PDU session (PDU session establishment message 426) with the primary/initiating terminal/device 401. This step is analogous to the step 18 in FIG. 5.

The distribution of terminal functions requires that function state information is synchronized among the various devices sharing the same PDU session, as shown at step 428. This includes the transferring of the function code as well as other data being used by the function. For example, game information of a game processing function in the initial device (e.g., WTRU 401 in FIG. 4) must be transferred to the new device) that the processing function is being transferred to (e.g., WTRU 403 in FIG. 4. Synchronizing states upfront ensures the continuity of the function execution among the devices, and reduces any further disruptions that may be incurred for performing state synchronization during function execution.

Execution of the distributed functions are initiated/continued by establishing communication among the corresponding functions, as illustrated by step 430. In an embodiment, the distribution of terminal functions can be performed using the standard 5G protocol for PDU sessions or can be further modified to optimize function distribution and/or discovery.

4. SLA Mapping for Terminal Function Distribution

Mobile devices have become more popular and have become the primary device of choice for consuming content and application experiences. Due to the recent advancements in varying device form factors, the ubiquity of those devices with varying capabilities (e.g., content presentation devices such as TVs and projectors) has increased. However, if consuming an experience (e.g., a single experience), users may be limited to the initial device that is being used for the experience, even though there may be better devices that may have become available around the users during the execution (e.g., as the users move, more devices may come into their vicinity), which may limit the experience to one device (e.g., often to their mobile devices—unless the users manually configure and start/transfer to their other devices).

Partitioning of terminal functions (e.g., audio/video processing, haptic feedback, XR processing) may allow users to distribute and/or offload one or more specific functionalities of the end device to other devices to be executed for improving the overall experience (e.g., a gaming experience may be transferred to a larger display and better gaming control equipment for improved user experience). Moreover, executing computing heavy functions on resource scarce mobile devices may cause battery drain. Offloading computing heavy functions to other devices may improve battery usage/life of the device, while allowing (e.g., also allowing) to harness enhanced functionality of other devices, improving the overall user experience.

In some examples, networking resources may be allocated to WTRUs by allocating specific network slices with the characteristics (e.g., URLLC, eMBB) satisfying the demands of the WTRUs. While a PDU session may include more than one data flow, slices may be assigned/allocated at the level of the PDU session (e.g., one slice per each PDU session). If a WTRU requires multiple slices, then multiple PDU sessions may be established with the 5G core (5GC).

Virtualization of terminal functions may enable functions to be flexibly managed dynamically and to be executed in a distributed manner (e.g., D2D, D2E, D2C). This may allow terminals to better harness the capabilities of the plethora of devices available in the network (e.g., IoT, cloud) for improving performance and user experience. The internal functionality of the resulting terminal sub-components may vary and, as a result, their computing and communication demands (e.g., requirements) may also vary (e.g., in an interactive gaming scenario a low-latency processing component may demand a higher Service Level Agreement (SLA) than other components). The distributed execution of functions may add inter-device/inter-function communication latencies to the overall execution, which may affect the application/function demands and, in-turn, the overall user experience. Optimizing one or more communication mediums through which the functions communicate may improve the overall QoS/QoE of the execution.

Varying demands in different functions may not be able to be addressed using just an SLA (e.g., a single SLA) set/class, for example, in the case of the integrated/non-virtualized/non-decomposed terminal, where a singled SLA may be allocated to the whole terminal. Examples of ensuring that demands of individual functions are met when maintaining the overall user experience are provided herein. Allocating/assigning the same SLA to sub-components (e.g., all sub-components) may result in either unused/wasted resources due to over provisioning or unsatisfied demands (e.g., requirements) of functions due to under provisioning. Slice networking capabilities may be realized/allocated per individual function (e.g., each individual function) before distributing for improving both terminal and network performance.

Figure 6:
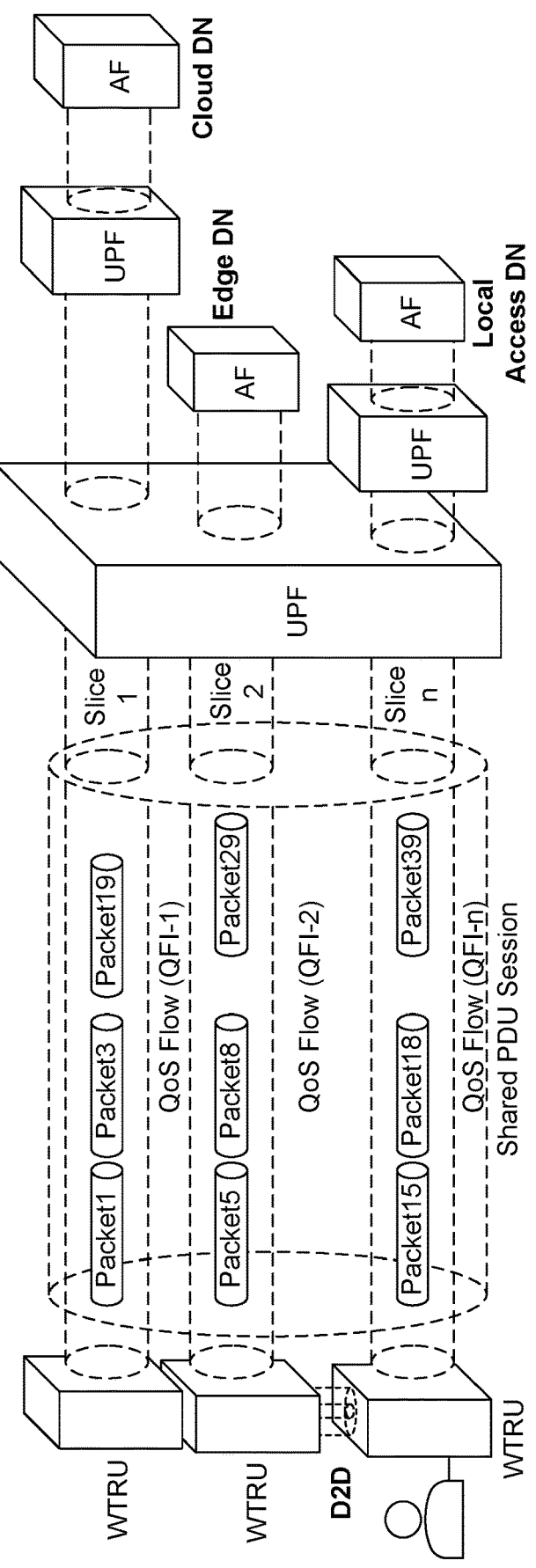
FIG. 6 is a block diagram illustrating an example of decomposed slices within a single PDU session for distributed WTRUs/terminals, in accordance with an embodiment.

Examples are provided herein for allocating network resources in a distributed manner and to spread the SLA across more than one device for a particular service. In an example, referring to FIG. 6, a procedure of terminal function(s) distribution using decomposed slices within a single PDU session is provided.

Figure 7:
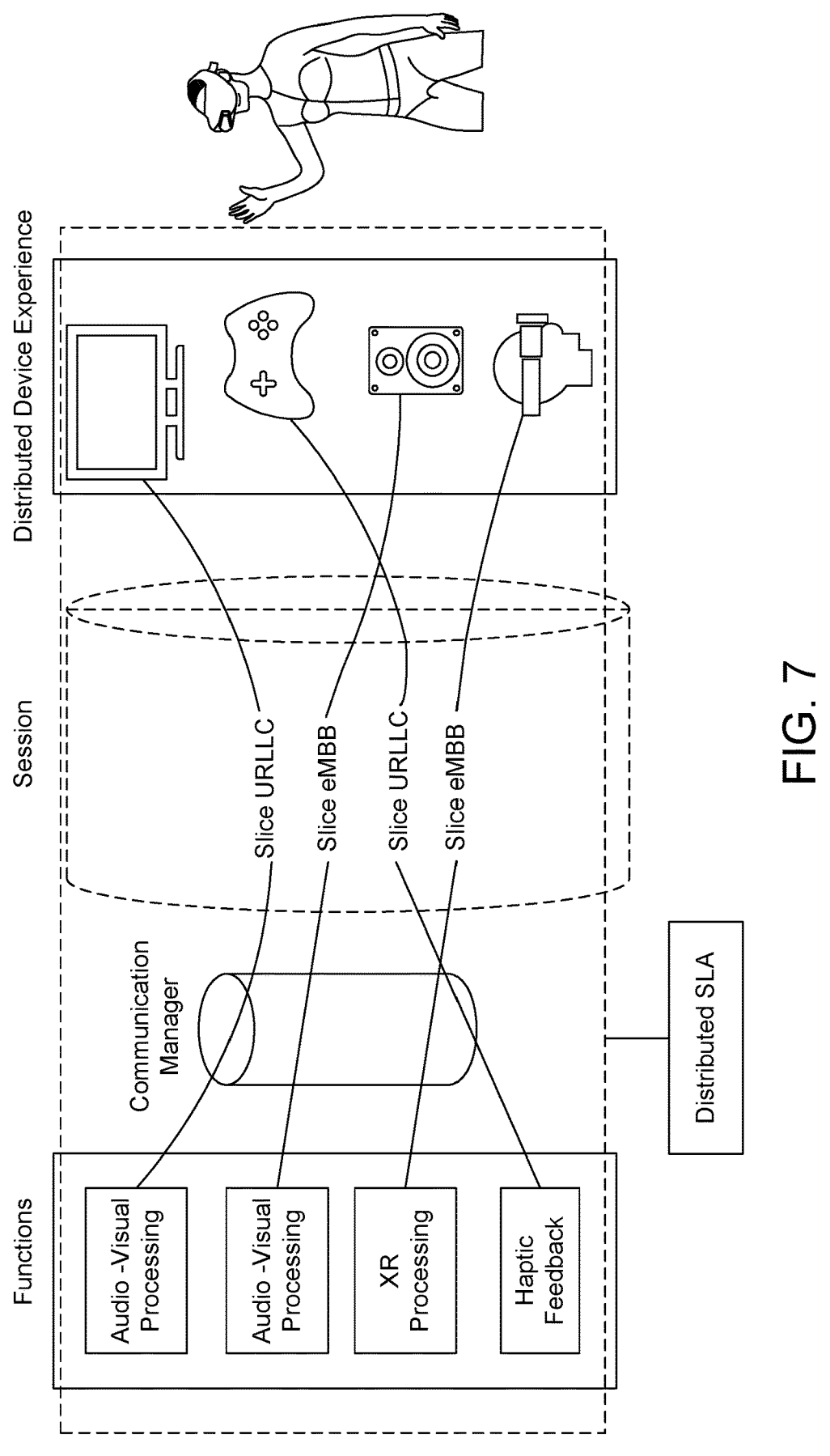
FIG. 7 is a diagram illustrating an example of distributed slices within a single session for terminal function distribution, in accordance with an embodiment.

Referring to FIG. 7, an example distribution procedure using distributed slices within a single session is provided. As shown in FIG. 7, different data that flows within a single session (e.g., a PDU session that is distributed across multiple devices) may be allocated with different slices (e.g., as opposed to allocating one slice for the whole session), based on the demands of the functions that have been partitioned and distributed across multiple devices. SLAs may be partitioned (or also be partitioned) to match the demands of the partitioned terminal functions.

Figure 8:
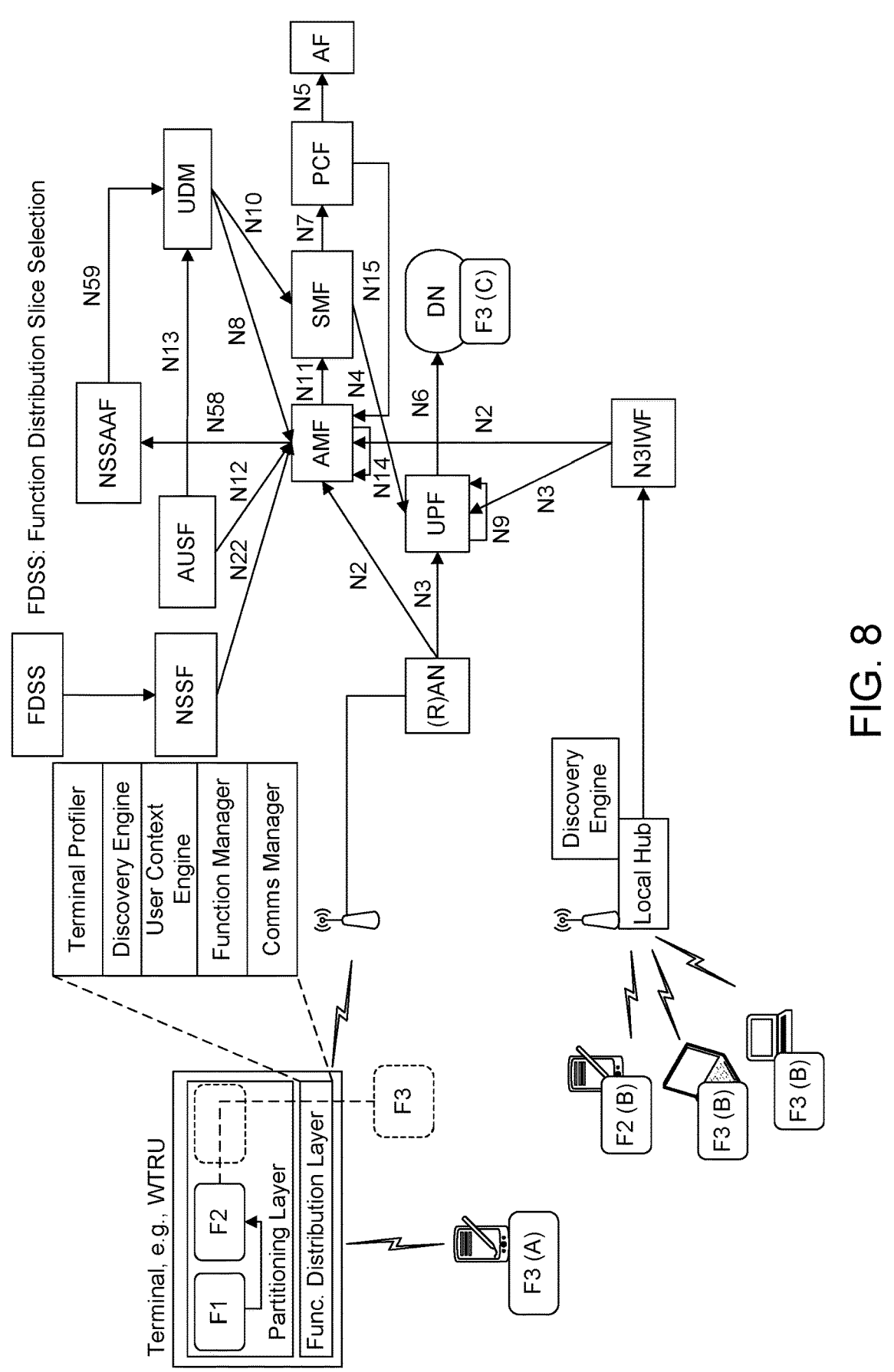
FIG. 8 is a diagram illustrating example architectures for device-to-device (D2D), device-to-edge (D2E), and device-to-cloud (D2C) scenarios, in accordance with one or more embodiments.

Referring to FIG. 8, an example architecture for terminal function(s) distribution is provided. As shown in FIG. 8, device-to-device (D2D), device-to-edge (D2E), and device-to-cloud (D2C) scenarios using terminal function(s) distribution are illustrated.

In this example, a Function Distribution Slice Selection (FDSS) may be provided. The FDSS function block may allow a WTRU's distributed functions with different QoS requirements to connect to 5G network slices. The FDSS function block may collect the distributed WTRU function QoS demands from the device discovery and communicate it to the network in form of a flag. The FDSS function block may communicate the available devices, the distributed functions, and their SLA to a Network Slice Selection Function (NSSF) (e.g., as shown in FIG. 8) to enable one or more slices to be registered and to be used for a session (e.g., a single PDU session) distributed based on the function SLA requirements. This functionality may be part of the existing NSSF.

A function distribution may be provided. A terminal function distribution layer may be concerned with virtualization of terminal functions, management of resources (e.g., device local and network), and/or function lifecycle. Functions at various layers of the device stack may be partitioned towards ultimately executing those functions across the network towards optimizing resources and user experience.

A terminal profiler may be provided. The profiler may provide functional (e.g., type of HW functions, system calls) and runtime information (e.g., runtime CPU and energy utilization) about existing individual device functions. Such information may be used for making function lifecycle management and resource management decisions, for example, by both function manager and comms manager components. The terminal profiler may be realized as an operating system or application layer service with security privileges to gather the information.

A user context engine may be provided. The user context engine may gather a user's contextual information both through the sensors in the device (e.g., user location through the GPS receiver), and through other services/applications providing information to user behavior (e.g., user calendar). The user context engine may be realized as an operating system or application layer service with API calls to corresponding sensor software drivers and webservices (e.g., REST API calls). Continuous gathering and storing of such information may lead to usage (e.g., excessive usage) of persistent and non-persistent storage. The user context engine may gather and store information if (e.g., only if) receiving requests from function and comms manager components.

A discovery engine may be provided. For offloading device functions, the function distribution layer may discover available devices that are previously unknown. In examples where the user is mobile, suitable devices may be discovered for offloading. The discovery engine may provide an API for actively registering/querying available devices (e.g., for function/comms manager components). Otherwise, the discovery channel may (e.g., may also) actively scout for devices around the user, by periodically scanning the networks, then providing newly found devices to the communication manager components. Such information in turn may be used for making function offloading/distribution decisions. The discovery engine may use discovery services provided by the network operator, discovery services provided by networks, or point-to-point devices/network (e.g., Bluetooth) discovery methods for discovering new devices.

A function manager may be provided. The function manager may make lifecycle management decisions on locally running device functions (e.g., turning off functions to save energy). The function manager may make (e.g., may also make) decisions on offloading/distributing functions to be executed on discovered devices that are better suited. The decisions being made may optimize the energy efficiency of the local device, resource utilization of the device and the network, and the overall user experience. Such decisions may be made based on user behavior (e.g., through a terminal context engine), resource consumption (e.g., through profiler), and user mobility/device availability (e.g., through discovery engine).

A communication manager may be provided. The communication manager may be concerned of managing the interconnectivity between devices that provide capabilities for the distributed execution of terminal functions. The communication manager may be concerned (e.g., may also be concerned) of managing the interconnectivity between the functions themselves. Such procedures may include selection (e.g., network selection) and management of communication medium for functions.

A local hub may be provided. End-user devices may provide its resources to be used by other devices/users in their vicinity (e.g., computing resources/display screens). The local hub may provide an API (e.g., functionality of the discovery engine) for such resource provider devices, for registering their capabilities, or to be discovered by other devices within the user vicinity (e.g., home, campus, shopping mall). Access to the hub and its APIs (e.g., registry and discovery) may be provided over a wireless network (e.g., Wi-Fi). Capability and available information of each registering device may be provided to the local hub during registration and stored in the hub until they are deregistered or a specific registration expiry time elapse. The local hub may operate as an independent entity without any direct connectivity to operator's core network, or it may connect to the operator's network as a non-3GPP network for extending various operator's network services to the connected devices/terminals.

In various embodiments, methods and procedures for mapping of SLAs for distributed terminal functions may be provided. The FDSS function block may allow a WTRU's distributed functions with different QoS demands to connect to 5G network slices. The FDSS may enable multiple slices to be registered and be used for a session (e.g., a single session) distributed based on the function SLA requirements. A network based solution via NSSF may be scalable (e.g., not just restricted to single session overall QoS demands, which may change). A network based solution via NSSF may (e.g., may also) allow knowledge from different functionality of a WTRU to be recorded so that a distributed slice selection may be done based on a function demand (e.g., each function requirement) and may be more accurate based on the defined SLAs.

Figure 9:
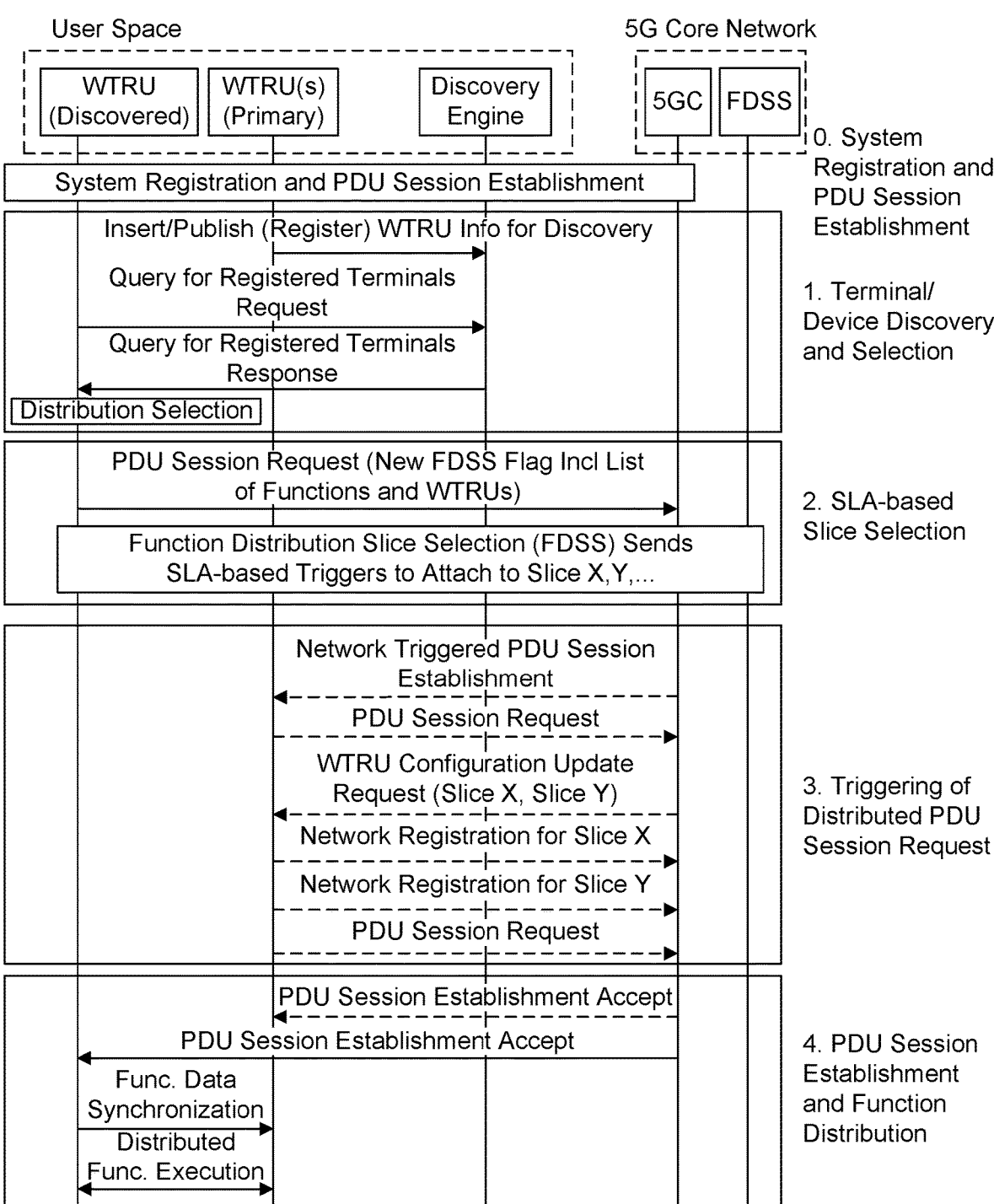
FIG. 9 is a signal flow diagram illustrating an example procedure of SLA mapping for terminal function distribution, in accordance with an embodiment.

Referring to FIG. 9, a signaling diagram is provided to illustrate an example of mapping of SLAs for terminal function(s) distribution. In this example, a call flow for the FDSS (e.g., located in the 5G core network) may set-up a new slice based on the function SLA in use. The FDSS may select a different slice for a single PDU session, for example the URLLC slice for the haptic session within the described gaming scenario, eMBB for the interactive video, and a default hybrid best effort slice for sensory information capturing user environment (e.g., temperature, light, location, etc.). The suggested solution may minimize the need to define multiple hybrid slices and may (e.g., may also) address the function demands on runtime (e.g., more specifically).

Figure 10:
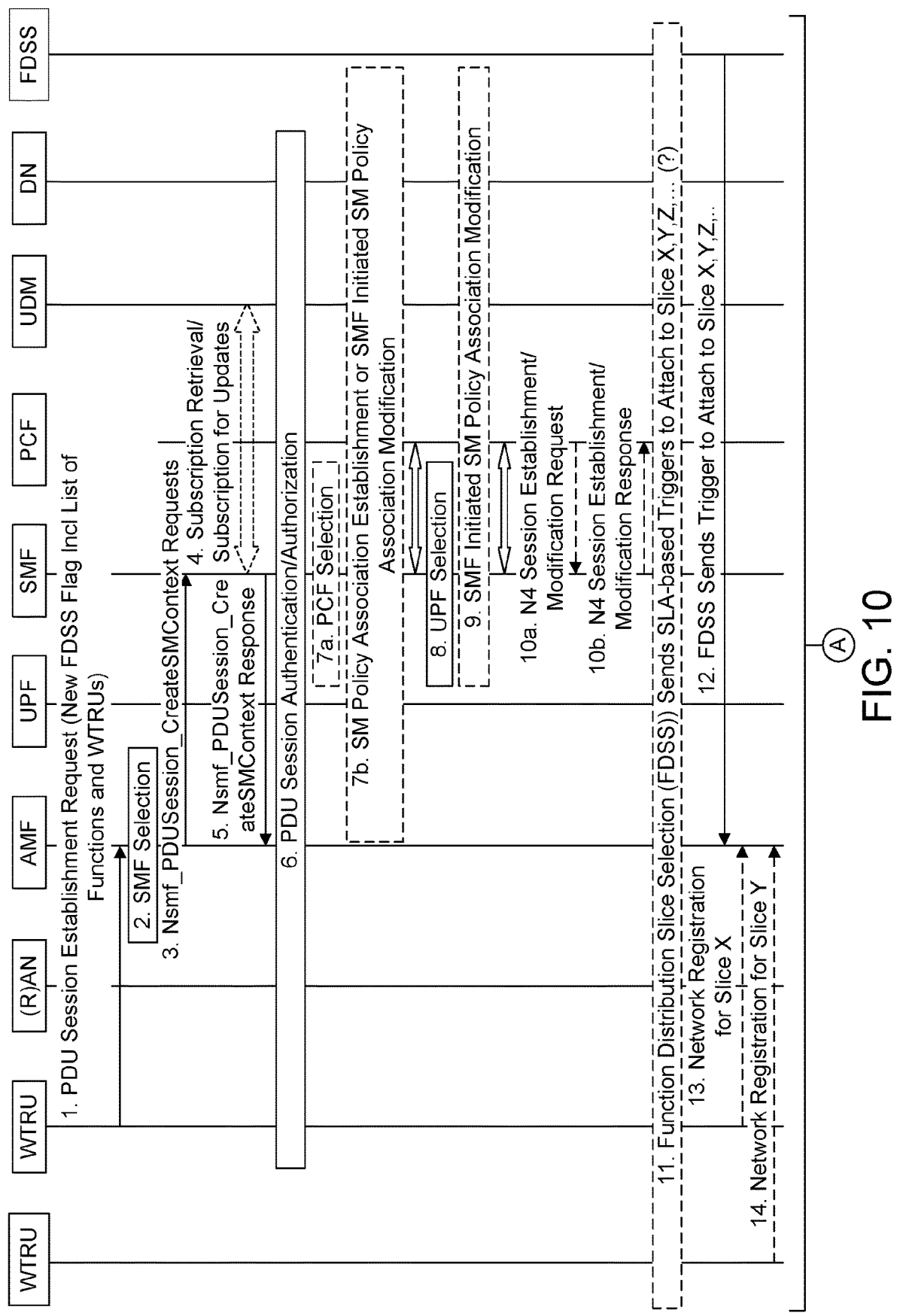
FIG. 10 is a signal flow diagram illustrating an example procedure for SLA mapping for distributed terminal functions over a PDU session, in accordance with an embodiment.
Figure 10:
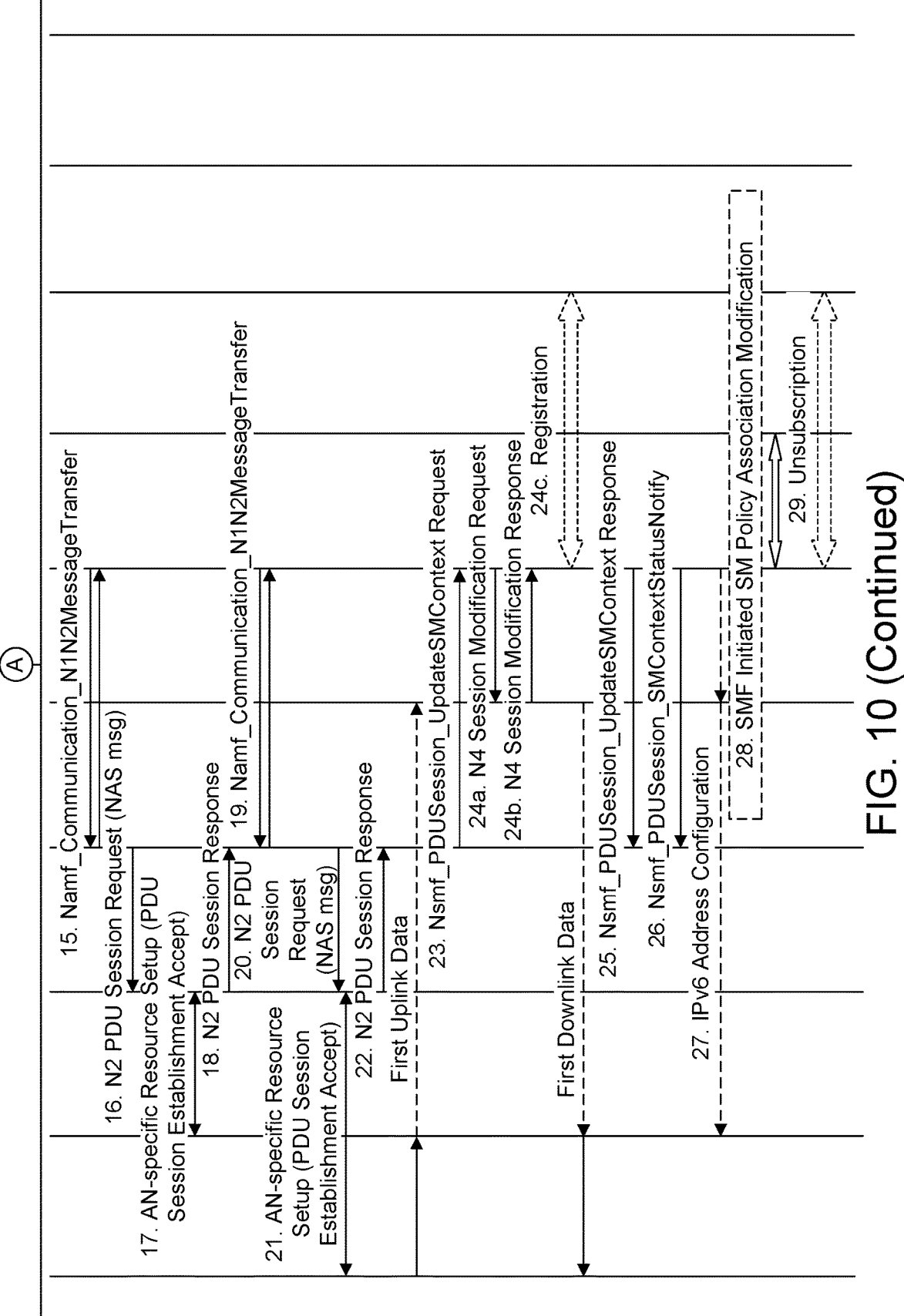

Referring to FIG. 10, an example procedure for SLA mapping for distributed terminal functions over a PDU session is provided.

In the example shown in FIG. 9 (and also refer to FIG. 10), one or more WTRUs register with a 5G system (e.g., 5G network slices) and establish initial PDU session(s). Terminals/devices (e.g., WTRUs) may be discovered and selected for the distribution of terminal functions. Terminals/devices that are available for onloading functions that are being distrusted may register with (e.g., insert or publish to) the discovery engine (e.g., in a local hub). The registration process may gather/collect and store the WTRU ID that may be being used for uniquely identifying the WTRU within the 5G Core (5GC) network. Along with the WTRU ID, a registering device (e.g., each registering device) may provide its computing capabilities (e.g., CPU size, RAM size, functions), networking capabilities (e.g., cellular status), and location information (e.g., GPS coordinates) to the discovery engine. Devices may register through an API that is provided by the discovery engine. The registration may be automatically performed by discovering terminals/devices within the proximity. The WTRU ID may (e.g., may also) be a service ID, or any other sharable ID which may be used to identify (e.g., uniquely identify) terminals/devices and/or services/functions within them. In some cases, the WTRUs may provide or send the WTRU ID and/or other information of the WTRU (e.g., computing capabilities, networking capabilities, and/or location information) to the discovery engine for distribution of terminal functions, which may occur before the registration with the 5G system, for example, when the WTRUs were not registered/deregistered, and/or the discovery engine holds previously stored information of the WTRUs. The active device scouting may trigger the devices register with the 5G system.

The primary/initiating WTRU may send a request for querying newly discovered/updated terminals/devices from the discovery engine. If the discovery engine resides within the same device, a callback or IPC procedure may be used for obtaining this information. The primary WTRU may have access permissions in the discovery engine (e.g., in the local hub) for obtaining this information. The primary WTRU may receive updates on newly discovered devices automatically. The discovery engine may respond back to the primary WTRU with information (e.g., all information) gathered in a registered device (e.g., each registered device). The primary WTRU may decide on the most suitable distribution of terminal functions among the devices. When making the function distribution decision, it may use information gathered from the profiler, the user context engine, or the discovery engine, for deciding what (which functions), when (the appropriate time), or where (best devices), to offload. The selection of the most suitable distribution of terminal functions may be performed by an entity within the network (e.g., an application function at the edge).

The primary WTRU (e.g., communication manager) may trigger the function distribution process by initiating connectivity to the selected devices. It may first initiate the creation of the PDU session, to be shared among participating devices (e.g., all participating devices) with varying slice mappings, by communicating with the 5G core network. This request may include a flag indicator and/or a list of functions (e.g., supported by an SLA) for enabling slice mapping performed by FDSS. These functions may be supported in many ways (e.g., including through a new multi-slice single PDU session ID to be shared by relevant devices (e.g., all relevant devices) supporting the service). As part of the new PDU session establishment, the primary WTRU may generates a new single PDU session ID. The IDs of the devices that were (or are being) selected, the list of functions (e.g., SLA), along with the generated PDU session ID, may be provided to the 5GC (e.g., SMF) for creating a single session to be distributed among the selected devices.

The session initiation may alter the PDU initiation procedures, such as 3GPP PDU initiation procedures, by incorporating the information of additional WTRU IDs to a PDU Session Establishment Request. The decision on the most suitable distribution of terminal functions may be performed by an entity in the network. This request may be performed by the corresponding entity (e.g., following a network triggered PDU session initiation). In some cases, the information received (e.g., by 5GC) may be communicated or send to FDSS.

In some examples, slice selection may be performed by FDSS (e.g., NSSF). The AMF may provide the list of S-NSSAIs, e.g., SLA-NSSAI, for the FDSS (e.g., NSSF) to select the appropriate slices instances, that may satisfy this SLA, and may distribute the result(s) to the WTRUs.

The AMF may select an SMF from the slice instances provided by the FDSS/NSSF, and the AMF may provide the distributed PDU session ID (e.g., which may be a new distributed PDU session ID), and the list of WTRUs for which a PDU session instance (e.g., from the same PDU session ID) may need to be established. Using a network initiated PDU session establishment, the 5GC may send PDU session trigger messages to terminals/devices (e.g., all terminals/devices) (e.g., WTRU IDs) that have registered to the corresponding slices. The 5GC may use existing trigger procedures (e.g., such as SMS). A Session Management Function (SMF) may send the trigger message to corresponding terminals/devices (e.g., all corresponding terminals/devices).

Terminals/devices (e.g., all terminals/devices), which receive the PDU session trigger request and have registered to the corresponding slices, may send a PDU session establishment request to 5GC.

Terminals/devices (e.g., all terminals/devices), which have not registered to their corresponding slices, may receive a WTRU configuration update request with the corresponding slice information.

Terminals/devices (e.g., all terminals/devices), which received the WTRU configuration update request with the corresponding slice information, may register with their corresponding slices, before establishing the new PDU session with the shared PDU session ID.

Examples of terminal function distribution and data/information synchronization may be provided. A core network, such as a 5G core network, may accept (or establish) PDU sessions with the provided terminals/devices (e.g., WTRU IDs), using the same session ID. Corresponding devices may be added to the PDU session (e.g., the same PDU session). The 5GC may accept and establish the PDU session with the primary/initiating terminal/device. Distribution of terminal functions may request or demand that function state information is synchronized among the devices. This may include the transferring of the function code as well as other data being used by the function. For example, game information of a game processing function in the initial device may be transferred to the new device the processing function is transferred to. Synchronizing states upfront may ensure the continuity of the function execution among the devices, and may reduce any further disruptions that may be incurred for performing state synchronization during function execution. Execution of the distributed functions may be initiated/continued by establishing communication among the corresponding functions.

CONCLUSION

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any WTRU recited herein, are provided with respect to FIGS. 1A-1D, 2, and/or 3.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc.

As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

Although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

No element, act, or instruction used in the description of the present application should be construed as critical or essential to the invention unless explicitly described as such. In addition, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. § 112, ¶6, and any claim without the word "means" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAS) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method implemented by a wireless transmit/receive unit (WTRU), the method comprising:

receiving identities of a set of devices available for sharing one or more terminal functions with the WTRU;

selecting at least one device of the set of devices to share the one or more terminal functions being performed by the WTRU; determining a session identifier (ID) associated with the one or more terminal functions, wherein the session ID is shared with the at least one device;

transmitting a session request, wherein the session request comprises information indicating at least the session ID and a respective identity of each of the at least one device;

receiving a response indicating a session establishment after the session request was transmitted;

transmitting, to the at least one selected device, function state information of the one or more terminal functions; and communicating with the at least one selected device to share performance of the one or more terminal functions.

2. The method of claim 1, further comprising: distributing the one or more terminal functions with each of the at least one device.

3. The method of claim 1, further comprising:

performing, by the WTRU, the one or more terminal functions; and querying, by the WTRU, a discovery engine for the set of devices available for sharing the one or more terminal functions with the WTRU.

4. The method of claim 3, further comprising:

registering with the discovery engine in a network to indicate availability of the WTRU to share the one or more terminal functions with the at least one device of the set of devices.

5. The method of claim 4, wherein the registering comprises transmitting any of: an identity of the WTRU, information of computing capabilities of the WTRU, information of networking capabilities of the WTRU, or information of a location of the WTRU.

6. The method of claim 1, wherein the transmitting of the function state information comprises transmitting of a function code.

7. The method of claim 1, further comprising: storing user contextual information, wherein the at least one device is selected from the set of devices based on the stored user contextual information.

8. The method of claim 7, wherein the user contextual information comprises at least one of 1) data from sensors in the WTRU and 2) user applications in the WTRU.

9. The method of claim 1, wherein the session ID is a packet data unit (PDU) session ID associated with the one or more terminal functions.

10. A wireless transmit/receive unit (WTRU) for wireless communications, the WTRU comprising a processor, a receiver, a transmitter, and memory, configured to:

receive identities of a set of devices available for sharing one or more terminal functions with the WTRU;

select at least one device of the set of devices to share the one or more terminal functions being performed by the WTRU;

determine a session identifier (ID) associated with the one or more terminal functions, wherein the session ID is shared with the at least one device;

transmit a session request, wherein the session request comprises information indicating at least the session ID and a respective identity of each of the at least one device;

receive a response indicating a session establishment after the session request was transmitted;

transmit, to the at least one selected device, function state information of the one or more terminal functions; and communicate with the at least one selected device to share performance of the one or more terminal functions.

11. The WTRU of claim 10, wherein the WTRU is further configured to distribute the one or more terminal functions with each of the at least one device.

12. The WTRU of claim 10, wherein the WTRU is further configured to:

perform the one or more terminal functions; and query a discovery engine for the set of devices available for sharing the one or more terminal functions with the WTRU.

13. The WTRU of claim 12, wherein the WTRU is further configured to register with the discovery engine in a network to indicate availability of the WTRU to share the one or more terminal functions with the at least one device of the set of devices.

14. The WTRU of claim 13, wherein the WTRU is further configured to transmit any of: an identity of the WTRU, information of computing capabilities of the WTRU, information of networking capabilities of the WTRU, or information of a location of the WTRU.

15. The WTRU of claim 10, wherein the WTRU is further configured to transmit a function code.

16. The WTRU of claim 10, wherein the WTRU is further configured to store user contextual information, wherein the at least one device is selected from the set of devices based on the stored user contextual information.

17. The WTRU of claim 16, wherein the user contextual information comprises at least one of 1) data from sensors in the WTRU and 2) user applications in the WTRU.

18. The WTRU of claim 10, wherein the session ID is a packet data unit (PDU) session ID associated with the one or more terminal functions.

* * * * *